M. B. OKUN.
COLLAPSIBLE COT.
APPLICATION FILED APR. 12, 1918.

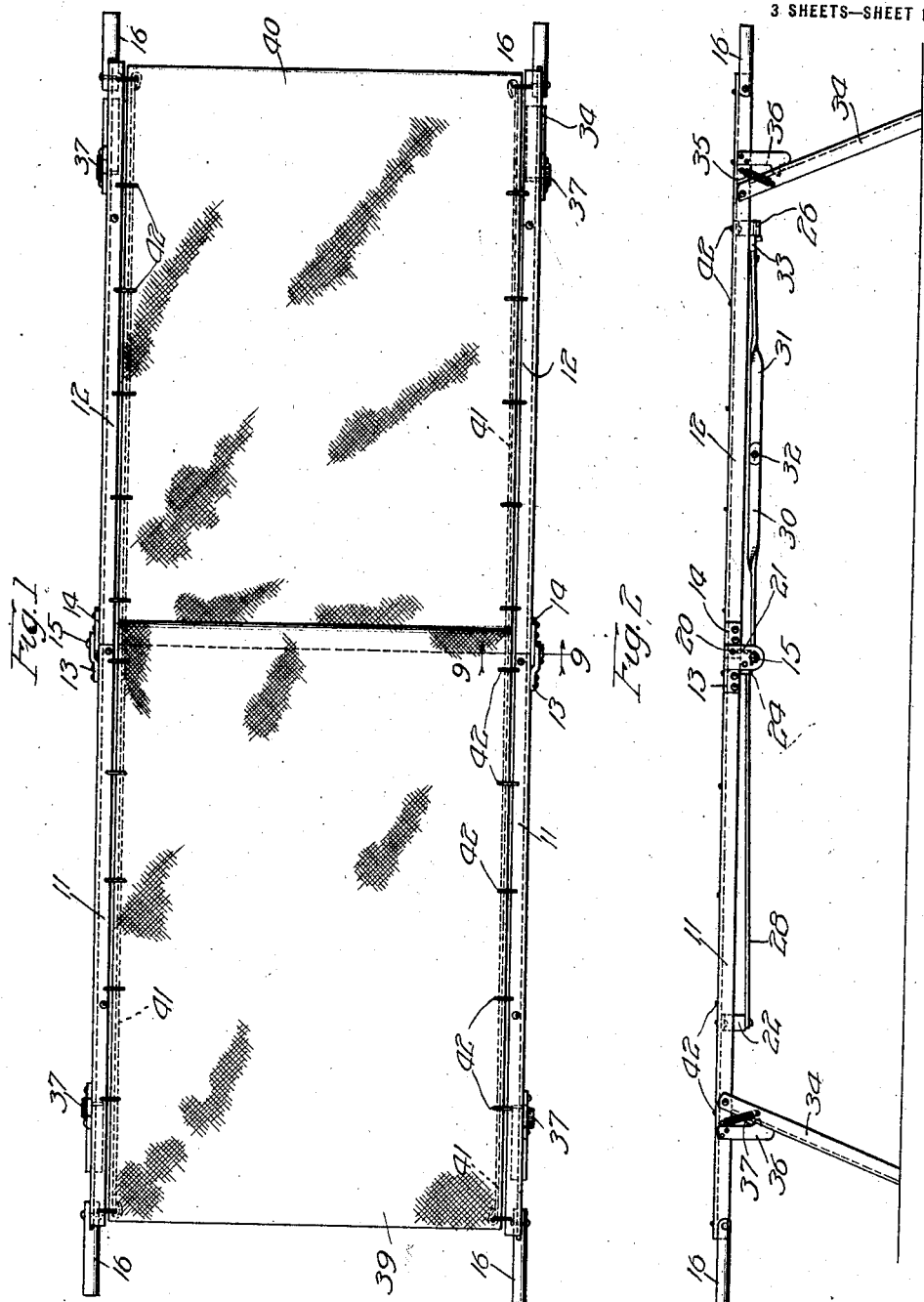

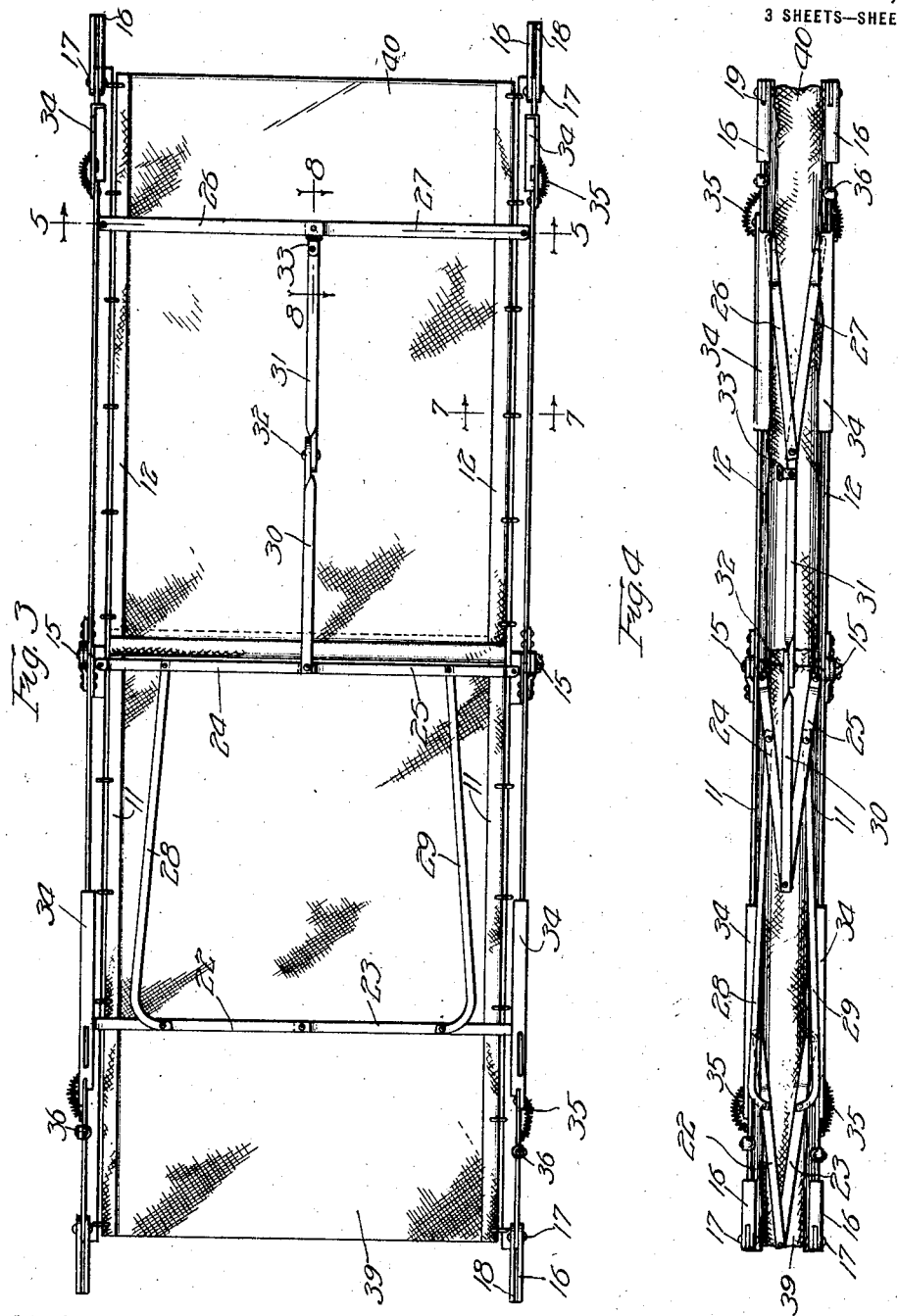

1,332,950.

Patented Mar. 9, 1920.
3 SHEETS—SHEET 3.

Witnesses:
Arthur W. Carlson
Robert H. Weir

Inventor
Morris B. Okun
by Jabel & Mueller
Attys.

UNITED STATES PATENT OFFICE.

MORRIS B. OKUN, OF CHICAGO, ILLINOIS, ASSIGNOR TO A. MURPHY, OF CHICAGO, ILLINOIS.

COLLAPSIBLE COT.

1,332,950.  Specification of Letters Patent.  Patented Mar. 9, 1920.

Application filed April 12, 1918. Serial No. 228,136.

*To all whom it may concern:*

Be it known that I, MORRIS B. OKUN, a citizen of the United States, residing at Chicago, in the county of Cook and State of Illinois, have invented a certain new and useful Improvement in Collapsible Cots, of which the following is a full, clear, concise, and exact description, reference being had to the accompanying drawings, forming a part of this specification.

My invention relates to collapsible cots and has for its object the provision of a cot structure so arranged that it may be readily collapsed from its normal expanded condition so as to occupy a very small space. The means permit collapsing both in the direction of the width of the cot and in the direction of the length thereof. Suitable means are provided for locking the cot in its expanded position, these means being so arranged preferably that they lock the cot structure in its open position at various points.

The preferred form also contemplates that these various locking means be conjointly actuated. My invention further contemplates means whereby the locking facilities aforementioned are of such a character as to permit readily of the collapsing in two directions, as above pointed out.

The invention furthermore contemplates means whereby the cot structure may under certain conditions be used as a stretcher. In the preferred form of this arrangement suitable handles disappearingly mounted may be provided.

The invention further contemplates in its preferred form that collapsible legs be provided preferably automatically locking in their extended and collapsed positions. The preferred arrangement is also such that when the device is used as a stretcher that the legs which serve normally to support the device as a cot are collapsed so that supplemental feet provided for this purpose come into play, which supplemental feet are of such character that they permit of the easy sliding of the device into an ambulance or other place where the device lends itself for use as a stretcher.

I will explain one form which my invention may take more in detail by referring to the accompanying drawings, in which—

Figure 1 is a top view of the expanded cot structure, showing however the handles in their operative instead of disappearing position;

Fig. 2 is a side view thereof;

Fig. 3 is a bottom view thereof;

Fig. 4 is a view looking in the same direction as Fig. 3, showing the handles in their disappearing position, and showing the cot in its longitudinally collapsed position;

Figure 9:
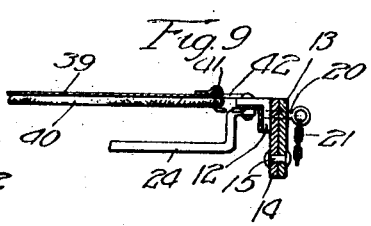
Fig. 9 is a sectional view on line 9—9 of Fig. 1.

My improved device consists of two side rails. These side rails each are composed of two angle iron bars 11 and 12 respectively, which abut end to end when the cot is in its expanded condition. At their meeting places the bars 11 and 12 are provided respectively with brackets 13 and 14, which brackets are pivotally united through the agency of the rivets 15. These bars 11 and 12 can therefore be swung into a collapsed position by being bent around the pivots 15, as will more readily appear hereinafter. At the free extremities of each of the bars 11 and 12, suitable handles 16 are provided, these handles being pivoted upon the webs of these bars by the rivets 17. As will be noted more clearly from Fig. 3, these handles 16 consist of tubes which are slit throughout their entire length at the bottom thereof as shown at 18. The slit is wide enough to accommodate the web of the bars 11 or 12. The handles 16 are also slit at their top portion as shown at 19 throughout a portion of their length. In this way I provide a simple expedient for mounting these handles in a disappearing manner, the slit 19 being continuous throughout only a portion of the length, causing these handles to be rigid, and permitting these handles when swung into the position shown in Fig. 3 to be used as handles, as the upper portion of the handle 16 rests below the horizontal portion of the bars 11 and 12. When these handles are swung into their disappearing position, however, the slot 18 permits these handles to envelop the downwardly extending webs of the bars 11 and 12 so that these handles do not protrude. As shown more clearly in Figs. 2 and 9, pins 20 are provided suitably held by chains 21 to lock the lugs 13 and 14 together when the cot is in its expanded condition, the pin 20 merely entering through registering holes provided in the lugs 13 and 14. Whenever the cot is to be folded about the rivets 15, then the pin 20 is of course withdrawn.

Figure 6:
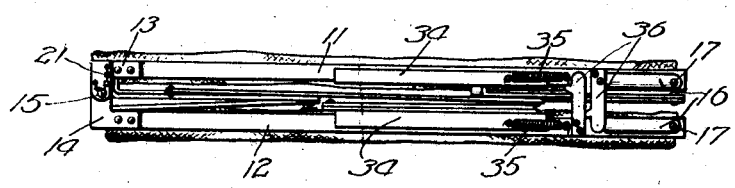
Fig. 6 shows the partly collapsed cot of Fig. 4 fully collapsed by being folded.
Figure 10:
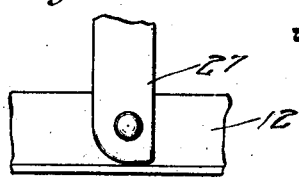
Fig. 10 is an enlarged fragmentary view of the extremity of one of the locking bars and the associated cot framework.

In order to permit collapsing of the cot into the condition shown in Fig. 4, the side bars 11 and 12 are associated together by means of links 22, 23—24, 25— and 26, 27. These links are pivotally united and at their free extremities are pivotally associated to the bars 11 and 12. In order to cause these links to move in unison when the cot is to be locked in its open position, as shown in Fig. 3, I provide additional links 28 and 29, which unite respectively the links 22, 24 and the links 23, 25. The pair of links 24, 25 is united to the pair of links 26, 27 by a further pair of pivotally united links 30, 31, respectively. The link 30, however, is associated with the links 24 and 25, that there may be a pivotal movement between these links 24, 25 and 30 only in the plane of these links. The same is true as to association of the link 31 with the links 26 and 27. The links 30 and 31 are united by the rivet 32. The reason for providing two links 30 and 31 and having them united pivotally is to permit of the folding of the cot from its condition as shown in Fig. 4 to its condition as shown in Fig. 6. When the cot of Fig. 3 is collapsed into the condition of Fig. 4, the rivet 32 alines itself with the rivets 15 so that a swinging action can properly take place. In order to cause the links heretofore referred to and by which the bars 11 and 12 are united to remain in an open position, I provide a dog 33 pivotally upon the link 31, which when swung into the position shown in Fig. 3, prevents the collapse of these links. When the cot is to be collapsed toward the position of Fig. 4, the locking dog 33 is swung outwardly, as shown in Fig. 4, to permit of this collapse. The extremities of the links 22, 23, 24, 25, 26 and 27 are formed as shown more clearly in Fig. 10, wherein the extremities are rounded throughout one-half of these extremities and are squared throughout the other half, thus preventing these links from moving to the right (Fig. 3) any farther than shown in Fig. 3.

Figure 5:
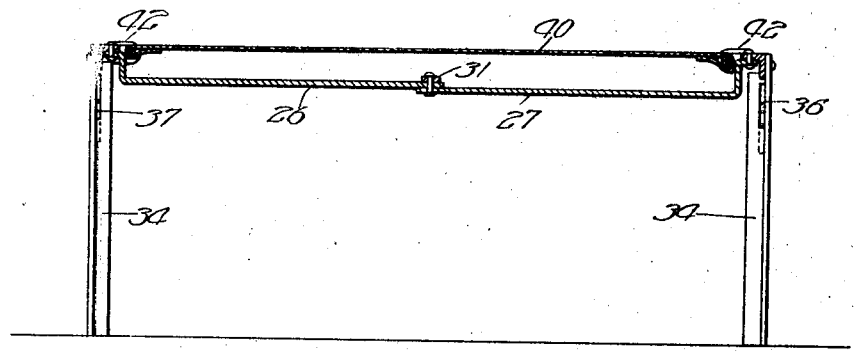
Fig. 5 is a sectional view on line 5—5 of Fig. 3.

The bars 11 and 12 are furthermore provided with legs 34, which legs are shown collapsed in Fig. 4 and at the left hand side of Fig. 3, but which legs are shown in their expanded condition at the right of Fig. 3. These legs are also shown in their open or extended position in Figs. 1 and 2. These legs are pivotally connected to the bars 11 and 12, and are preferably controlled in their two limiting positions by springs 35. The bars 11 and 12 have downwardly extending feet 36 which normally limit the movement of the legs 34, these feet being provided with projecting lugs 37 entering suitable holes provided for this purpose in the legs, as is more clearly apparent from Fig. 5.

Figure 8:
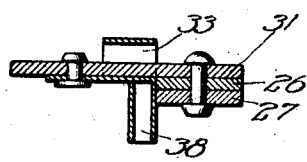
Fig. 8 is a sectional view on line 8—8 of Fig. 3.

In order to collapse the cot from the position shown in Figs. 1 and 3, the feet 34 are first collapsed so that they rest against the bars 11 and 12, whereupon the locking dog 33 is swung into its non-locking position. Thereupon the bars 11 and 12 of one side member may be swung toward the bars 11 and 12 of the other side member, whereupon the cot assumes the condition shown in Fig. 4. Thereupon, one cot extremity is swung toward the other cot extremity so that the parts come together as shown in Fig. 6. It will be readily seen that the cot when thus collapsed occupies a position which is only one-half as long as the expanded cot and which is only one-sixth as wide as the expanded cot, and in thickness it occupies probably one-third as much space as the expanded cot. In this way cots may be shipped in great quantities in a very small space. The dog 33 is provided with a downwardly projecting finger piece 38, as shown more clearly in Fig. 8, so that it may be more readily manipulated. The supplemental feet 36 are rounded as shown so as to permit of an easy sliding of the device upon the floor should the legs be collapsed and the device used as a stretcher.

Figure 7:
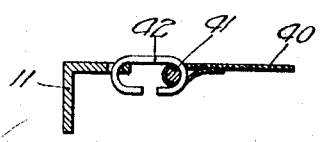
Fig. 7 is a fragmentary sectional view on line 7—7 of Fig. 3.

The bars 11 and 12 respectively serve as supports for two canvas strips or hammock portions 39 and 40 respectively. The sides of these canvas strips are folded as shown more clearly in Fig. 7 and carry throughout their length at both sides metal rods 41, thus to maintain an unruffled appearance. The canvas strips 39 and 40 are suitably united to the side rods by hooks 42, as shown more clearly in Fig. 7, these hooks surrounding the rods 41. The strip 39 is made to overlap the strip 40 at the center portion thereof, as shown more clearly in Fig. 1, so as to provide the necessary continuity. The strips 39 and 40 could not be made in one piece because of the folding characteristics of the framework, as will be readily apparent. The rods 41 are of assistance in maintaining a smooth joint between the canvas strips 39 and 40 at their meeting points.

The supplemental feet 36 as shown more clearly in Fig. 6 are so arranged that they clear when the device is in its completely collapsed condition.

From what has been thus described the nature of my invention will be readily clear to those skilled in the art.

Having however thus described one form which my invention may take, what I claim as new and desire to secure by Letters Patent is:

1. A collapsible cot having side frames, and means for connecting said side frames whereby said side frames may be moved toward and away from each other to thereby extend or collapse the structure, said means including a longitudinally extending link consisting of pivotally united sections, said side frames having means whereby they may be folded, said pivotally united sections aforesaid having their pivot when said cot is collapsed longitudinally to substantially coincide with the pivot about which said side frames are folded.

2. A collapsible cot having side frames, and means for connecting said side frames whereby said side frames may be moved toward and away from each other to thereby extend or collapse the structure, said means including a longitudinally extending link consisting of pivotally united sections, each said side frame consisting of two pivotally united sections adapted to be folded when collapsed and adapted to extend substantially end to end when unfolded, said pivotally united sections aforesaid having their pivot when said cot is collapsed longitudinally to substantially coincide with the pivot about which said side frames are folded.

3. A collapsible cot having side frames, means for connecting said side frames whereby said side frames may be moved toward and away from each other to thereby extend or collapse the structure, said side frames having means whereby they may be folded, and disappearing handles carried by said side frames, said disappearing handles consisting of slotted tubes pivotally mounted upon the extremities of said side frames.

4. A collapsible cot having side frames, means for connecting said side frames whereby said side frames may be moved toward and away from each other to thereby extend or collapse the structure, each said side frame consisting of two pivotally united sections adapted to be folded when collapsed and adapted to extend substantially end to end when unfolded, and disappearing handles carried by said side frames, said disappearing handles consisting of slotted tubes pivotally mounted upon the extremities of said side frames.

5. A collapsible cot having side frames, and means for connecting said side frames whereby said side frames may be moved toward and away from each other to thereby extend or collapse the structure, said side frames having means whereby they may be folded, foldable legs carried by said side frames, stops to hold said legs in their unfolded position, and resilient means adapted to hold said legs either against said stops or against said side frames.

6. A collapsible cot having side frames, means for connecting said side frames whereby said side frames may be moved toward and away from each other to thereby extend or collapse the structure, each said side frame consisting of two pivotally united sections adapted to be folded when collapsed and adapted to extend substantially end to end when unfolded, foldable legs carried by said side frames, stops to hold said legs in their unfolded position, and resilient means adapted to hold said legs either against said stops or against said side frames.

7. A collapsible cot having side frames, and means for connecting said side frames whereby said side frames may be moved toward and away from each other to thereby extend or collapse the structure, said side frames having means whereby they may be folded, foldable legs carried by said side frames, supplemental feet carried by said side frames adapted to support said side frames when said legs are in their collapsed position, said supplemental feet acting as stops for said legs when said legs are in their unfolded position, and resilient means for holding said legs either against said feet or against said side frames.

8. A collapsible cot having side frames, means for connecting said side frames whereby said side frames may be moved toward and away from each other to thereby extend or collapse the structure, each said side frame consisting of two pivotally united sections adapted to be folded when collapsed and adapted to extend substantially end to end when unfolded, foldable legs carried by said side frames, supplemental feet carried by said side frames adapted to support said side frames when said legs are in their collapsed position, said supplemental feet acting as stops for said legs when said legs are in their unfolded position, and resilient means for holding said legs either against said feet or against said side frames.

9. A collapsible cot having side frames, means for connecting said side frames comprising a plurality of foldable cross links and longitudinally extending links interconnecting the cross links to cause them to move in unison whereby said side frames may be moved toward and away from each other to thereby extend or collapse the structure, said side frames having means whereby they may be folded, two hammock portions carried by said side frames, said hammock portions meeting when the cot is unfolded over the folding axis of said side frames to thereby permit folding of said side frames without distortion of said hammock portions and foldable legs separate from said connecting means carried by said side frames, said hammock portions when said cot is collapsed being exteriorly of said legs.

10. A collapsible cot having side frames formed in sections, means pivotally connecting said sections and permitting them to be folded only in one direction, collapsible means for holding said frames in spaced relation, foldable legs separate from the collapsible means carried by the frame sections, said pivoted connecting means comprising a plurality of foldable cross links and longitudinally extending links interconnecting the cross links to cause them to move in unison.

In witness whereof, I hereunto subscribe my name this 23rd day of March, A. D., 1918.

MORRIS B. OKUN.